(12) United States Patent
Yoshida et al.

(10) Patent No.: US 8,180,403 B2
(45) Date of Patent: May 15, 2012

(54) RECOVERY METHOD AND RADIO NETWORK CONTROLLER IN RADIO COMMUNICATION SYSTEM

(75) Inventors: Hideaki Yoshida, Kawasaki (JP); Yuji Munakata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 745 days.

(21) Appl. No.: 11/907,566

(22) Filed: Oct. 15, 2007

(65) Prior Publication Data

US 2008/0144491 A1  Jun. 19, 2008

(30) Foreign Application Priority Data

Dec. 15, 2006  (JP) .................. 2006-339131

(51) Int. Cl.
*H04B 1/38* (2006.01)
(52) U.S. Cl. ......... 455/560; 455/561; 455/458; 455/517
(58) Field of Classification Search .................. 455/560, 455/561, 458, 56, 517, 423
See application file for complete search history.

(56) References Cited

U.S. PATENT DOCUMENTS

| | | |
|---|---|---|
| 2003/0003895 A1 | 1/2003 | Wallentin et al. |
| 2003/0050097 A1* | 3/2003 | Amirijoo et al. ............. 455/560 |
| 2003/0162503 A1 | 8/2003 | Lecren |
| 2005/0213555 A1* | 9/2005 | Eyuboglu et al. ............. 370/349 |

FOREIGN PATENT DOCUMENTS

| | | |
|---|---|---|
| EP | 1408658 A2 | 4/2004 |
| JP | 2004-166233 A | 6/2004 |
| JP | 2005-510155 | 4/2005 |
| JP | 2005-530463 A | 10/2005 |
| JP | 2006-324833 A | 11/2006 |
| JP | 2007-502070 A | 2/2007 |
| WO | 0162030 | 8/2001 |
| WO | 03043364 | 5/2003 |
| WO | WO-2004/028174 A1 | 4/2004 |
| WO | WO-2005/015857 A1 | 2/2005 |

OTHER PUBLICATIONS

European Search Report based on EP 07118420 (dated May 26, 2008).
Japanese Office Action, mailed Jul. 12, 2011 for corresponding Japanese Application No. 2006-339131, with English-language Translation.

* cited by examiner

*Primary Examiner* — Kamran Afshar
*Assistant Examiner* — Manpreet Matharu
(74) *Attorney, Agent, or Firm* — Fujitsu Patent Center

(57) ABSTRACT

When a first MS control signalling device that controls a mobile station fails, a second MS control signalling device takes over the processing of the first MS control signalling device. The second MS control signalling device requests a RLC parameter necessary for communication of the mobile station, and the mobile station transmits the requested RLC parameter to the second MS control signalling device. The second MS control signalling device controls communication of the mobile station, using the obtained RLC parameter. A data path for transmitting user data of the mobile station is not released but is held when the MS control signalling devices are switched.

9 Claims, 13 Drawing Sheets

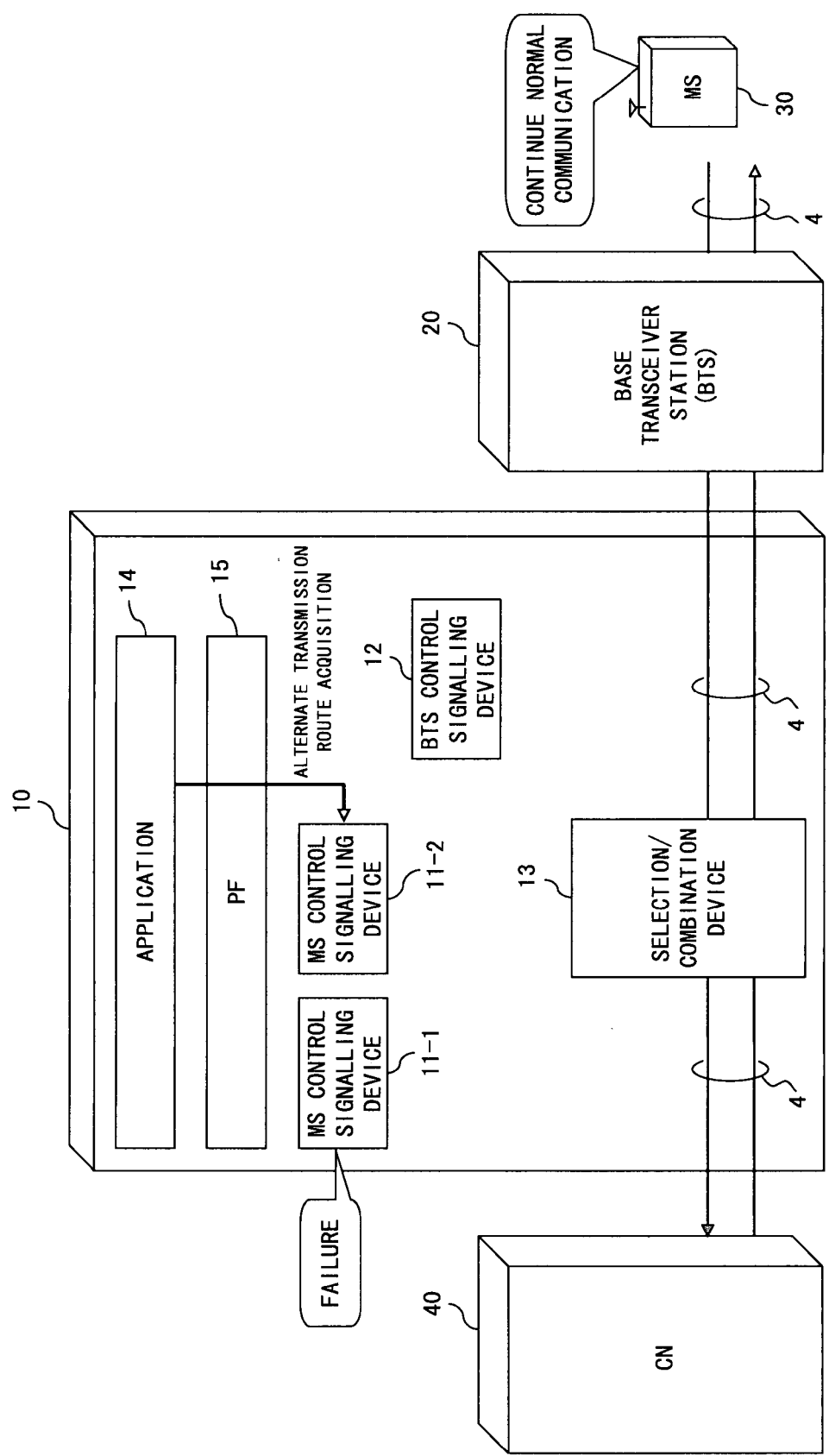
F I G. 7

| PARAMETER NAME | | METHOD 1 | METHOD 2 |
|---|---|---|---|
| SECRET PARAMETER | SECRET KEY | SETTING FROM APPLICATION | INFORMATION TAKE OVER FROM MS |
| | UPLINK HFN | SETTING FROM APPLICATION | INFORMATION TAKE OVER FROM MS |
| | DOWNLINK HFN | SETTING FROM APPLICATION | INFORMATION TAKE OVER FROM MS |
| STATUS VARIABLE | TRANSMISSION SN | INITIALIZATION BY RLC RESET PROCEDURE | INFORMATION TAKE OVER FROM MS |
| | TRANSMISSION WINDOW | INITIALIZATION BY RLC RESET PROCEDURE | INFORMATION TAKE OVER FROM MS |
| | RECEPTION SN | INITIALIZATION BY RLC RESET PROCEDURE | INFORMATION TAKE OVER FROM MS |
| | RECEPTION WINDOW | INITIALIZATION BY RLC RESET PROCEDURE | INFORMATION TAKE OVER FROM MS |

FIG. 10

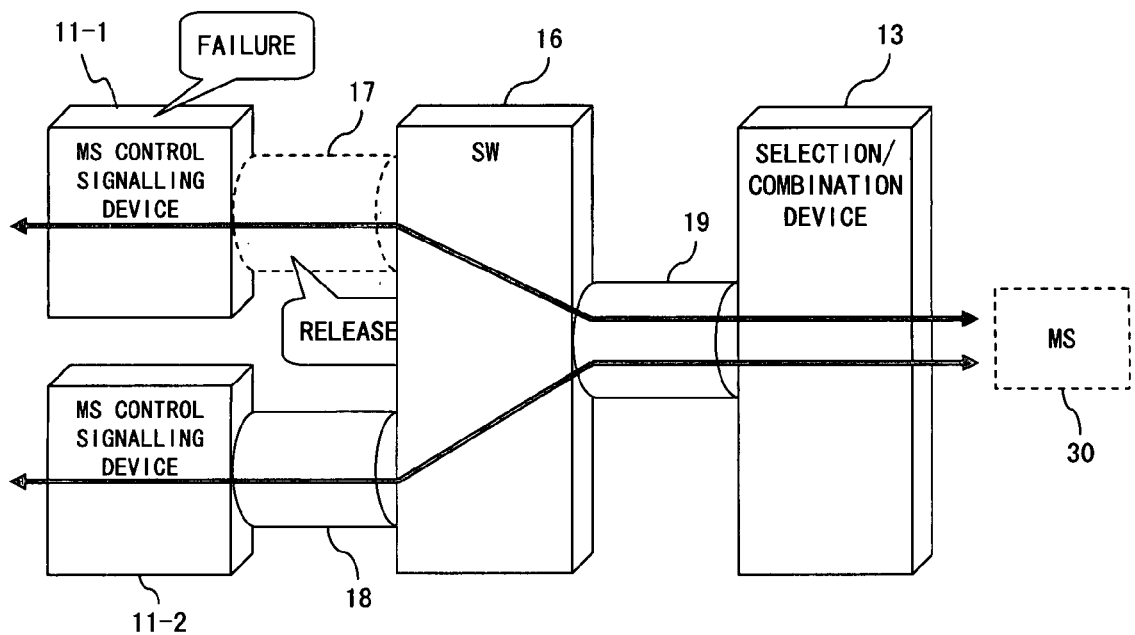
F I G. 1 1

RECOVERY METHOD AND RADIO NETWORK CONTROLLER IN RADIO COMMUNICATION SYSTEM

BACKGROUND OF THE INVENTION

1. Field of the Invention

The present invention relates to a recovery method in a case of failure on a route for transmitting a control signal in a radio communication system, and to a radio network controller comprising such a recovery function.

2. Description of the Related Art

Radio communication systems such as a mobile communication system comprise a plurality of base transceiver stations (BTS) (also referred to as node B), and mobile stations (MS) (also referred to as user equipment (UE)) such as cellular phone devices are accommodated by the nearest base transceiver station. A radio network controller (RNC) is connected to a single or a plurality of base transceiver station(s). The radio network controller controls the base transceiver station(s), and also controls mobile stations accommodated by the base transceiver station.

FIG. 1 is a diagram showing a configuration of a radio network controller. In the diagram, a configuration specified by 3GPP is shown as an example.

A radio network controller 10 comprises a plurality of MS control signalling devices 11, a BTS control signalling device 12, and a selection/combination device 13. The MS control signalling device 11 terminates DCCH (Dedicated Control Channel), and executes processing relating to RLC (Radio Link Control) protocol specified by 3GPP.TS25.322. The MS control signalling devices 11 also transmits/receives a control signal (e.g. instructions such as call request and call ending) to/from a mobile station 30. The BTS control signalling device 12 terminates CCCH (Common Control Channel), and transmits/receives a control signal to/from a base transceiver station 20. The selection/combination device 13 relays a signal between the base transceiver station 20 and a correspondent node (CN) 40. Here, the selection/combination device 13 comprises a selecting/combining function, a copy/distributing function, and a cipher/decipher function. The selecting/combining function is for selecting a signal having the best quality when a signal transmitted from the mobile station 30 is received via a plurality of base transceiver stations 20. The copy/distributing function is for transmitting a signal directed to the mobile station 30 via the plurality of base transceiver stations 20. The cipher/decipher function is for ciphering and transmitting a user signal as well as deciphering the received ciphered signal to regenerate the user signal. An application 14 and a platform (PF) 15 are software executed by a call control processor, and provide communication services by controlling the MS control signalling devices 11, the BTS control signalling device 12, and the selection/combination device 13.

An MS control signal for controlling communication relating to the mobile station 30 is transmitted/received between the application 14 and the mobile station 30. Here, between the application 14 and the MS control signalling device 11, an MS control signal 1 of RRC (Radio Resource Control) layer is transmitted/received. Between the MS control signalling device 11 and the mobile station 30, an MS control signal 2 of an RLC layer is transmitted/received. On the other hand, a common control signal 3 for controlling the base transceiver station 20 is transmitted/received between the application 14 and the base transceiver station 20. User data 4 is, in the example shown in FIG. 1, transmitted/received via the selection/combination device 13. In such a case, the MS control signal 2 is also transmitted/received via the selection/combination device 13.

FIG. 2 through FIG. 5 are diagrams explaining recovery procedures in a case that the MS control signalling device 11 fails in the radio network controller 10. In this diagram, the radio network controller 10 comprises a plurality of MS control signalling devices 11 (11-1, 11-2, . . . ), and the MS control signalling device 11-1 is assigned to the mobile station 30.

When the MS control signalling device 11-1 fails, as shown in FIG. 2, the MS control signals 1 and 2 that are transmitted/received by the MS control signalling device 11-1 stop. The application 14 then releases a data path of the mobile station 30 controlled by the MS control signalling device 11-1 as shown in FIG. 3. As a result, the mobile station 30 cannot receive the MS control signal 2 and the user data 4, and detects the network failure accordingly.

The mobile station 30, when detecting the failure, transmits a reconnection request using the common control signal 3 as shown in FIG. 4. This reconnection request is received by the application 14. The application 14 sends back a reconnection response to the mobile station 30 via another MS control signalling device (in this case, the MS control signalling device 11-2). Since then, the mobile station 30 transmits/receives the MS control signal 2 to/from the MS control signalling device 11-2.

In addition, the application 14, as shown in FIG. 5, acquires the data path for transmitting the user data 4 of the mobile station 30, and notifies the selection/combination device 13 of the data path. As a result, the data path for transmitting the user data 4 of the mobile station 30 recovers.

Note that Patent Document 1 (Kohyo (National Publication of Translated Version) No. 2005-510155) describes a method in a mobile communication system comprising a radio network controller, a radio transceiver station, and a mobile station to acquire environment information from a mobile station when the radio network controller recovers from failure. In this document, the environment information identifies each mobile station. The radio network controller recovers communication of the mobile station using the environment information.

As explained above, in the conventional technologies, when an MS control signalling device fails, a data path for transmitting user data is once released. For that reason, when the MS control signalling device fails during a mobile station is transmitting/receiving audio data, there occurs a several seconds of silence. The above recovery procedures are executed upon the reconnection request from the mobile station. In other words, the radio network controller could not execute the recovery procedure autonomously.

Note that the above problem can occur not only in the case of an MS control signalling device failure but also in a case that a failure occurs on a route for transmitting an MS control signal and in a case that the service is suspended due to blockage etc.

SUMMARY OF THE INVENTION

It is an object of the present invention to reduce the time required for recovery in failure occurrence in a radio communication system. It is another object of the present invention to enable a network apparatus to perform autonomous failure recovery in a radio communication system.

A failure recovery method of the present invention is used in a radio network controller having a plurality of mobile station control units. The method comprises: holding a data path of a mobile station controlled by a first mobile station control unit, when a mobile station control signal relating to the first mobile station control unit stops; and establishing a control path for transmitting a mobile station control signal between a second mobile station control unit and the mobile station while the data path of the mobile station is held.

According to the method, because a data path is maintained when the mobile station control units are switched, the time required for recovery is reduced as well as reducing influence on the communication of the mobile station.

In the above failure recovery method, a communication parameter relating to communication of the mobile station may be initialized in the second mobile station control unit and the mobile station, and communication of the mobile station may be controlled by using the initialized communication parameter. According to this method, it is possible to synchronize the parameters used in the radio network controller and the mobile station.

In the above failure recovery method, a communication parameter relating to communication of the mobile station may be transmitted from the mobile station to the second mobile station control unit in response to a request of the second mobile station control unit, and communication of the mobile station may be controlled by using the communication parameter obtained by the second mobile station control unit. According to this method, the radio network controller can obtain the parameter required for controlling communication of the mobile station.

A radio network controller of the present invention comprises: a plurality of mobile station control units; a data path unit for establishing a data path for transmitting user data of a mobile station controlled by a first mobile station control unit; and a control unit for, when a control signal that the first mobile station control unit controls the mobile station stops, establishing a control path for transmitting a control signal between a second mobile station control unit and the mobile station. The data path unit holds the data path of the mobile station when the control unit establishes the control path due to the stop of the control signal.

According to the above configuration, because a data path is maintained when the mobile station control units are switched, influences on the communication of the mobile stations are reduced.

The second mobile station control unit may initialize a communication parameter relating to communication of the mobile station, and may control communication of the mobile station using the initialized communication parameter. Alternatively, the second mobile station control unit may obtain a commutation parameter relating to communication of the mobile station from the mobile station, and may control communication of the mobile station using the obtained communication parameter. According to these configurations, the radio network controller can start recovery procedure autonomously without the request from the mobile station.

According to the present invention, it is possible to reduce recovery time in failure occurrence in a radio communication system. In addition, according to another mode of the present invention, a network apparatus can perform autonomous failure recovery in a radio communication system.

BRIEF DESCRIPTION OF THE DRAWINGS

FIG. 6 through FIG. 9 are diagrams explaining recovery procedures of the embodiment;

FIG. 10 is a table comparing methods of taking over the RLC parameter;

FIG. 11 is a diagram explaining a method of switching the MS control signalling devices in the embodiment;

DESCRIPTION OF THE PREFERRED EMBODIMENTS

Figure 1:
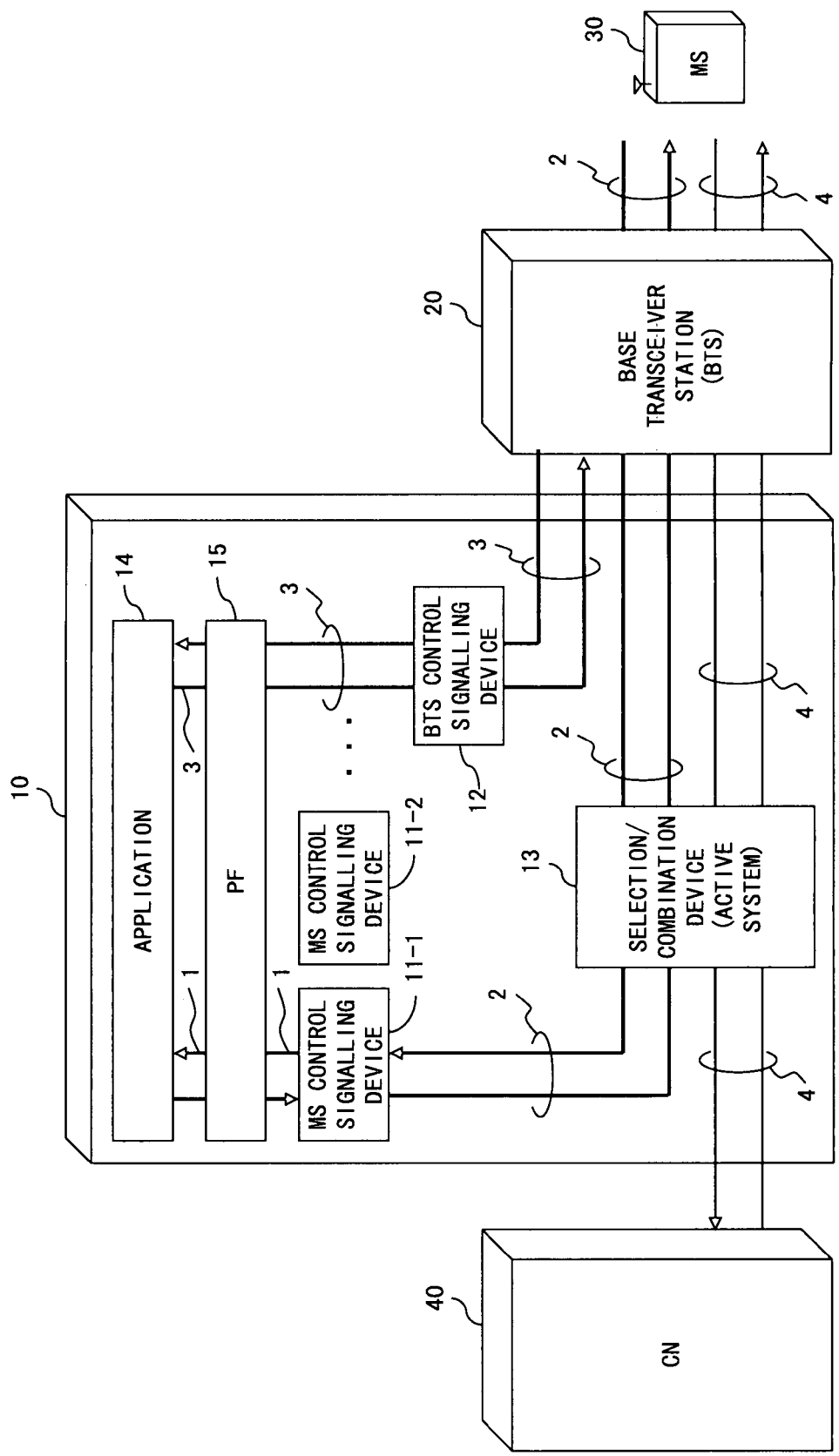
FIG. 1 is a diagram showing a configuration of a radio network controller.
Figure 2:
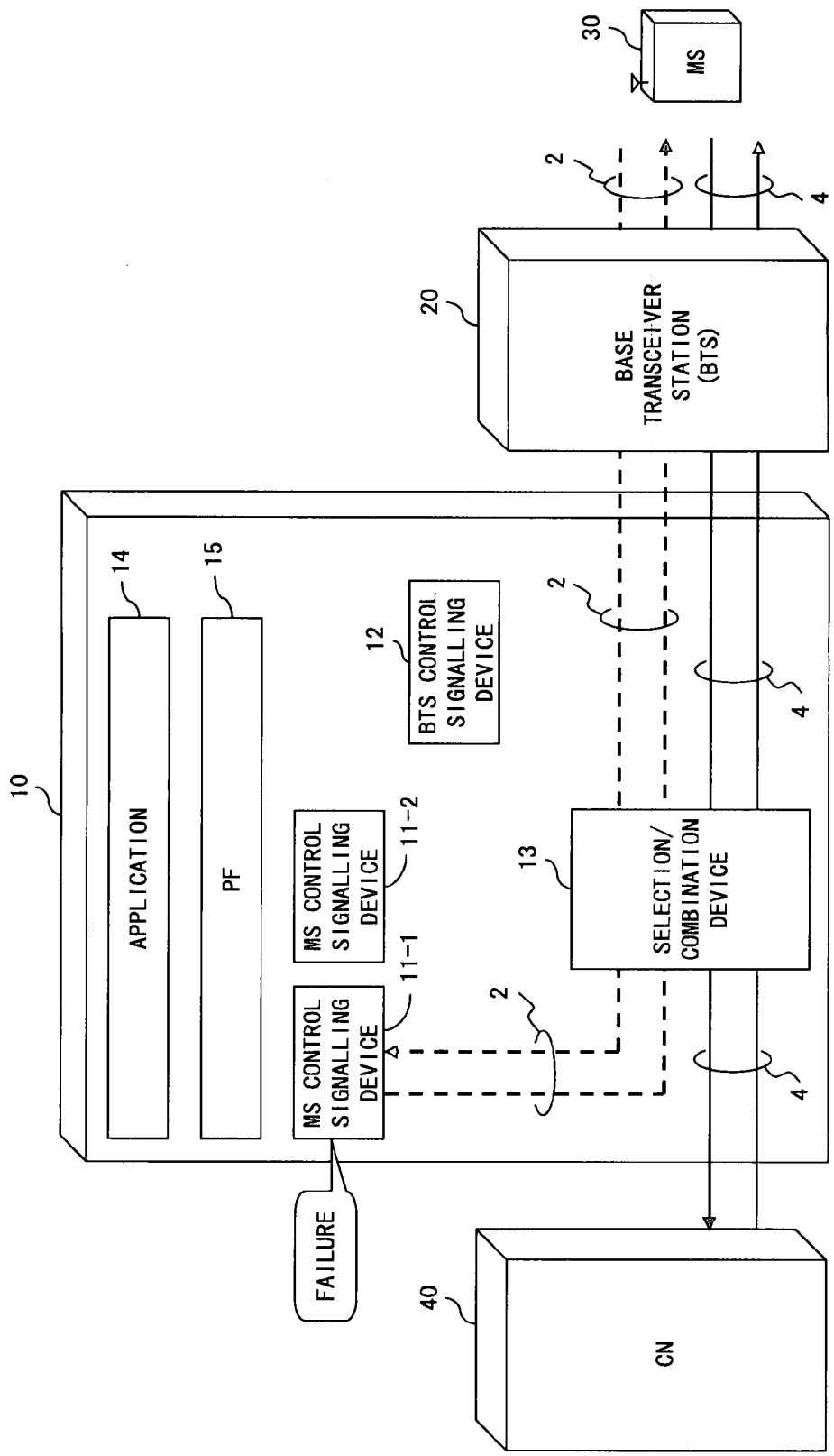
FIG. 2 through FIG. 5 are diagrams explaining recovery procedures of related art.
Figure 3:
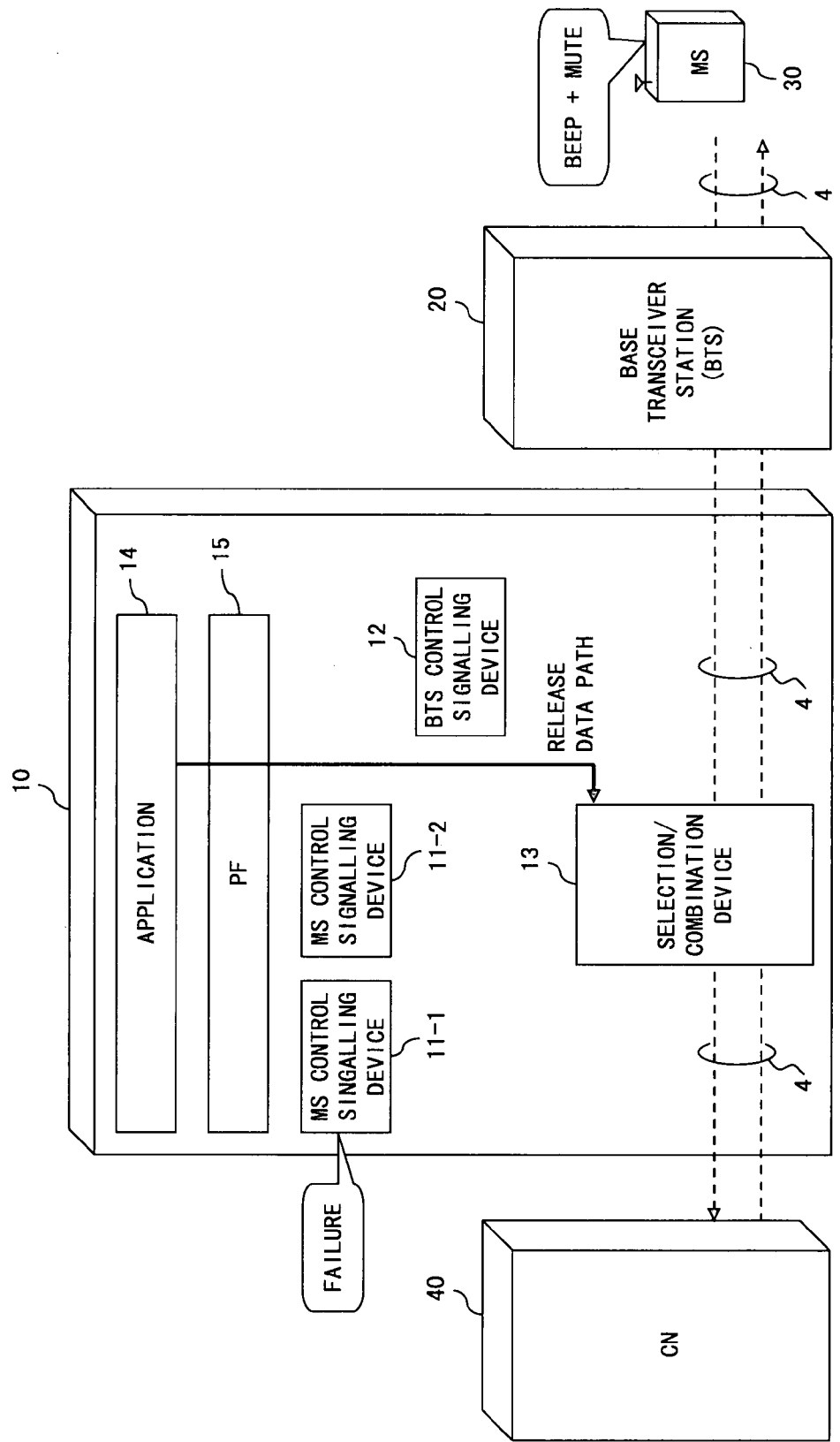
Figure 4:
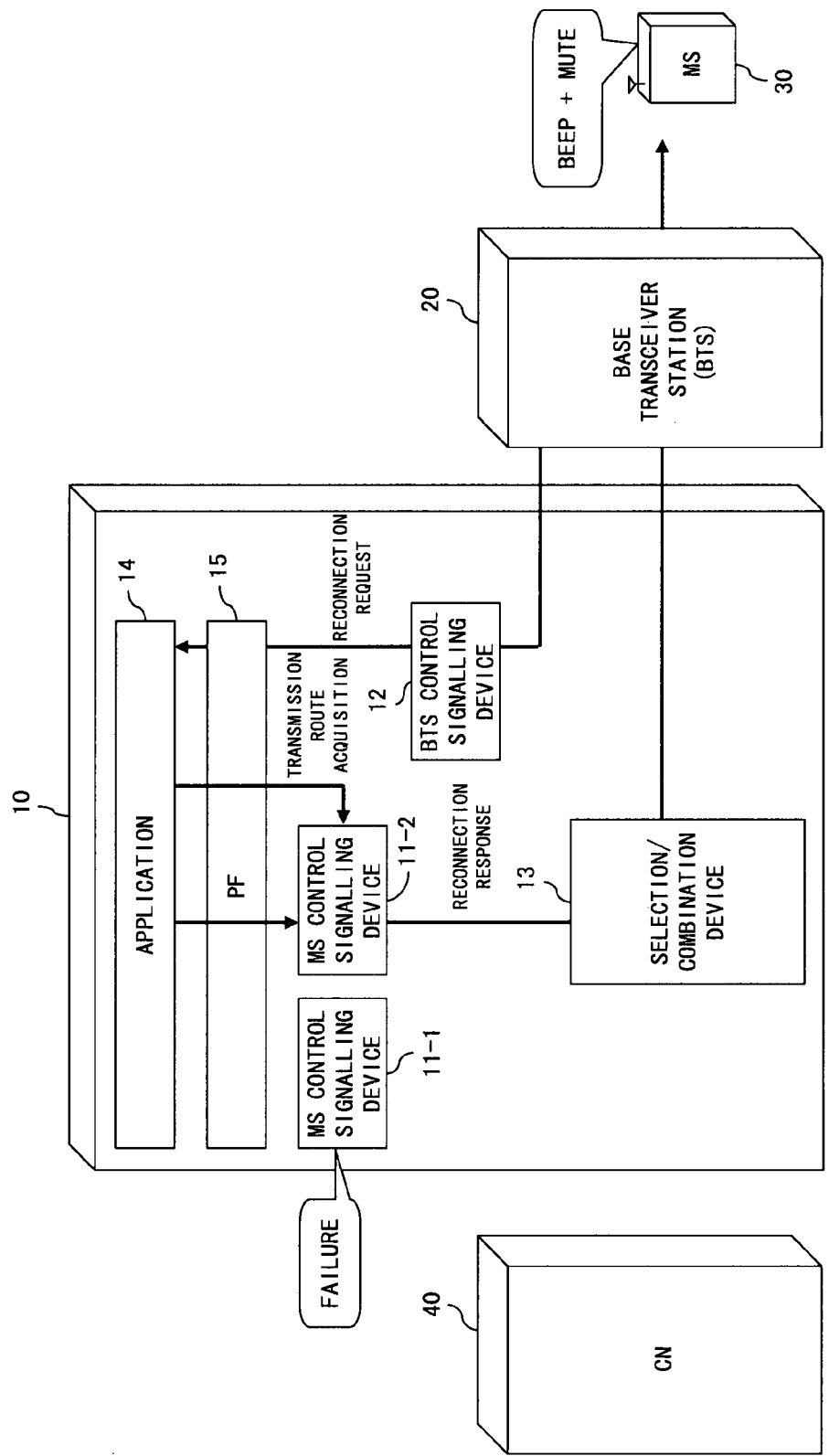
Figure 5:
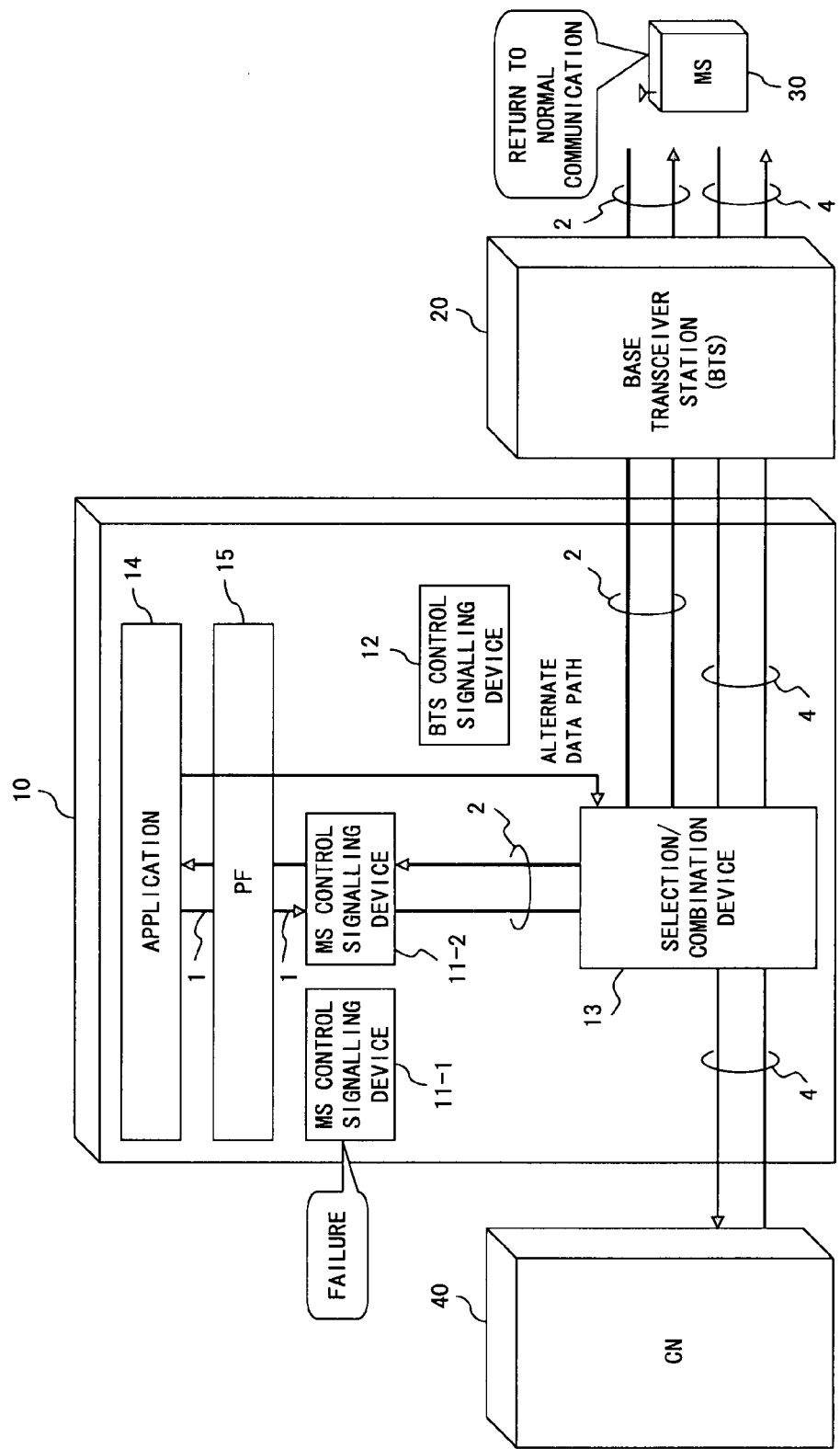

In the following description, a radio network controller and a recovery method of the embodiments of the present invention are set forth with reference to the drawings. The description assumes a radio communication system specified by 3GPP. In other words, a radio communication system comprises a base transceiver station (BTS or node B) and a radio network controller (RNC), and a mobile station (MS or UE) is accommodated by the nearest base transceiver station. Note that a basic configuration of the radio network controller is the same as explained with reference to FIG. 1.

FIG. 6 through FIG. 9 are diagrams explaining recovery procedures in a radio network controller when an MS control signalling device fails. Here, a radio network controller 10 comprises a plurality of MS control signalling devices 11 (11-1, 11-2, ... ), and the MS control signalling device 11-1 is assigned to a mobile station 30. In such a case, an MS control signal 2 is transmitted/received between the MS control signalling device 11-1 and the mobile station 30. The MS control signal 2 is a signal of an RLC layer (layer 2). Note that an MS control signal 1 transmitted/received between an application 14 and the MS control signalling device is a signal of an RRC layer (layer 3). Note that user data 4 of the mobile station 30 is assumed to be transmitted to/received from a correspondent node (CN) 40 via a selection/combination device 13.

Figure 6:
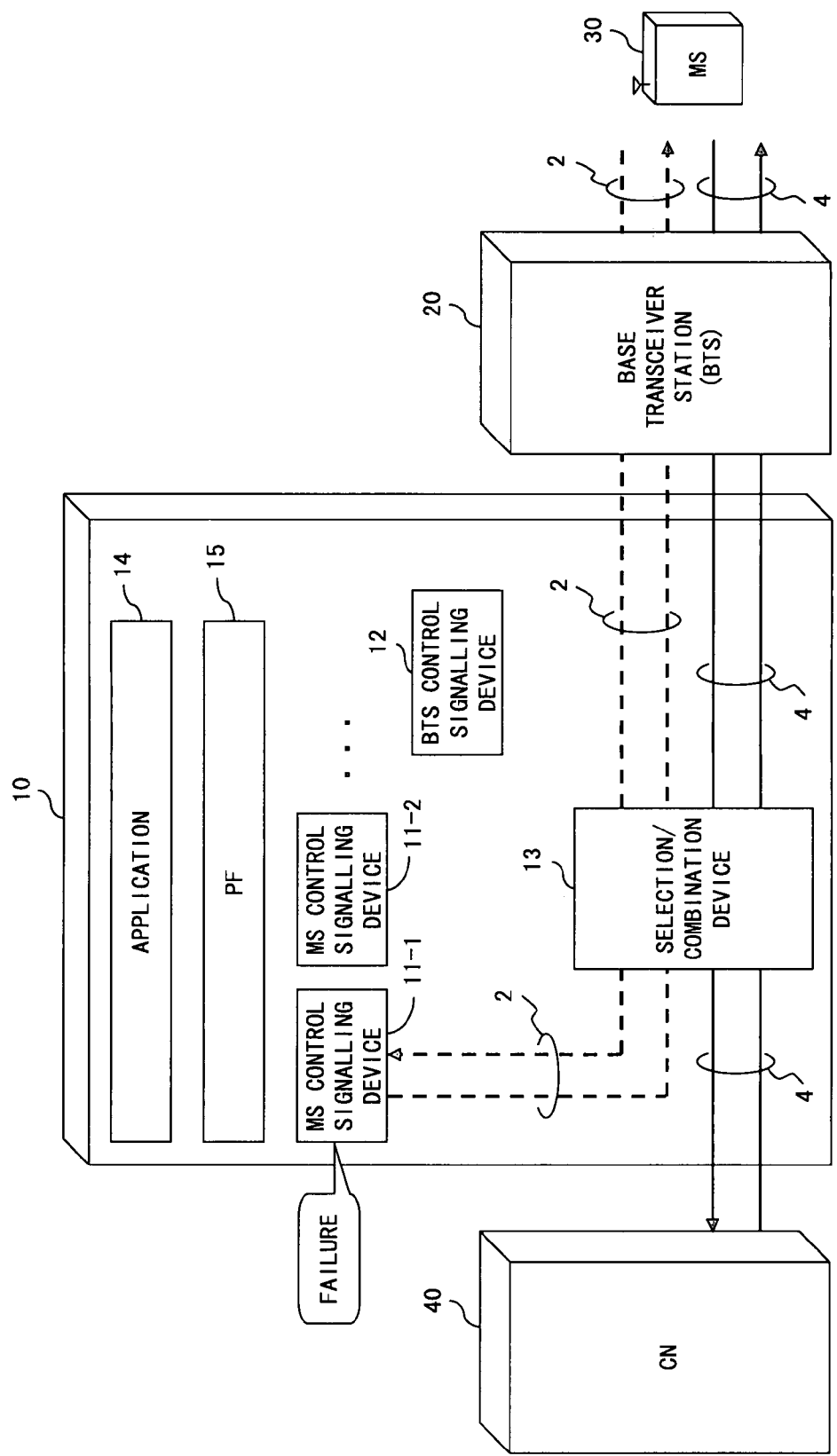

As shown in FIG. 6, assume that the MS control signalling device 11-1 has failed. At that time, the failure is detected by, for example, a parity check executed in the MS control signalling device. The MS control signalling device 11-1, when the failure is detected, stops the transmission of the MS control signal 2 to the mobile station 30. The application 14 and a platform (PF) 15 are notified of the failure occurrence by the MS control signalling device 11-1. Here, the platform 15 manages the status of the MS control signalling devices 11 (11-1, 11-2, ... ). In other words, the platform 15 manages whether or not each of the MS control signalling devices 11 is operating normally, loading state of each of the MS control signalling devices 11, and others. Note that when a serious failure occurs in the MS control signalling device 11, the platform 15 can detect the occurrence of the serious failure.

Even when the MS control signalling device 11 fails, the operation of the selection/combination device 13 does not change. Accordingly, transmission/reception of the user data 4 of the mobile station 30 is continued via the selection/combination device 13.

The application 14, as shown in FIG. 7, selects a normally operating MS control signalling device by referencing to the platform 15. If there are a plurality of normally operating MS control signalling devices, an MS control signalling device with a minimum loads is selected for example. In this example, the MS control signalling device 11-2 is to be selected. The application 14 assigns the mobile station 30 to the selected MS control signalling device 11-2. As a result, an alternate transmission route of the MS control signal is acquired between the application 14 and the mobile station 30. A setting method of the alternate transmission route is explained later.

Note that even if an MS control signalling device fails, the application 14 does not release the data route for the user data (audio data, packet data, etc.) of the mobile station controlled by the MS control signalling device. Therefore, transmission/reception of the user data 4 of the mobile station 30 is continued via the selection/combination device 13.

The MS control signalling device 11-2 requires a communication parameter in order to control the communication of the mobile station 30. Here, "communication parameter" is a parameter used in an RLC protocol, and in this embodiment, as shown in FIG. 10, the parameter includes status variables (transmission sequence number, reception sequence number, transmission window size, reception window size) and secret parameters (secret key, uplink HFN (Hyper Frame Number), downlink HFN). In order to continue the communication of the mobile station 30 without any change, it is preferable that the MS control signalling device 11-2 takes over the communication parameter that the MS control signalling device 11-1 had used. However, it is not possible to take over the communication parameter from the failed MS control signalling device 11-1. The recovery procedures of the embodiment, therefore, set the communication parameter employing any of the following methods.

<Method 1: Initialization>

The MS control signalling device 11-2 initializes a sequence number and a window size of the mobile station 30 using an RLC reset procedure. By the initialization, the sequence number for flow control of the user data 4 is initialized to "zero" in both of the MS control signalling device 11-2 and the mobile station 30. In the transmission of the user data 4, transmission order of each frame (or each packet) is secured between the MS control signalling device 11-2 and the mobile station 30. However, in such a case, the user data 4 has to be retransmitted from the "sequence number=0".

The secret key and HFN are provided from the application 14. These parameters are set in both of the MS control signalling device 11-2 and the mobile station 30.

The RLC reset procedure is employed between a pair of entities implementing the RLC protocol, and it is basically realized by RESET message and RESET ACK message. Detailed information on the RLC reset procedure is specified in 3GPP.TS25.322.

<Method 2: Acquisition From Mobile Station>

Figure 8:
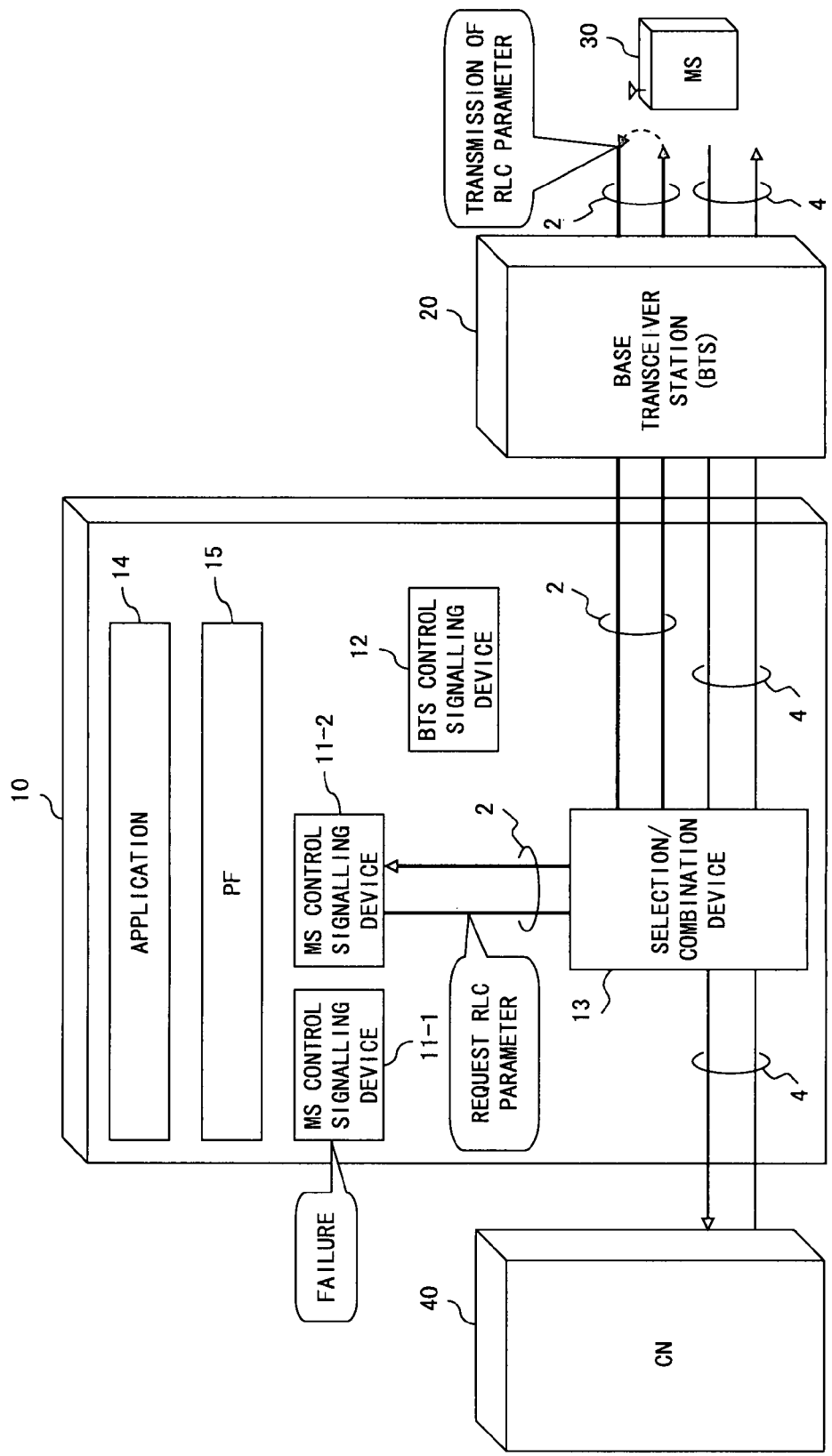

The RLC parameter is used in both of the MS control signalling device and the mobile station. The RLC parameters in the MS control signalling device and the mobile station are synchronized with each other. In other words, when the MS control signalling device 11-1 failed, the RLC parameter held in the mobile station 30 is the same as the RLC parameter held in the MS control signalling device 11-1. The newly selected MS control signalling device 11-2 requests the mobile station 30 to provide the RLC parameter as shown in FIG. 8. Consequently, the MS control signalling device 11-2 can substantially take over the RLC parameter that the MS control signalling device 11-1 had used.

It is preferable that the request for the RLC parameter from the MS control signalling device to the mobile station is realized in the RLC protocol. Therefore, the recovery procedure of the embodiment newly defines a "waiting for recovery" as a "state" in the RLC layer. In addition as the MS control signal of the RLC protocol, "RLC parameter request" is newly defined.

When the MS control signalling device 11-2 is selected due to the failure of the MS control signalling device 11-1, the MS control signalling device 11-2 shifts to the state "waiting for recovery". Next, the MS control signalling device 11-2 transmits a control PDU (Protocol Data Unit) storing the "RLC parameter request" to the mobile station 30 as the MS control signal 2. The mobile station 30, when receiving the request, sends back the RLC parameters (sequence number, window size, secret key, HFN) to the MS control signalling device 11-2. As a result, the MS control signalling device 11-2 acquires the RLC parameter relating to the communication of the mobile station 30, and shifts from "waiting for recovery" to "normal communication". Note that the MS control signalling device 11-2, when receiving the MS control signal 1 from the application 14 during the "waiting for recovery", transmits the MS control signal 2 corresponding to the received signal to the mobile station 30 after shifting to "normal communication".

Figure 9:
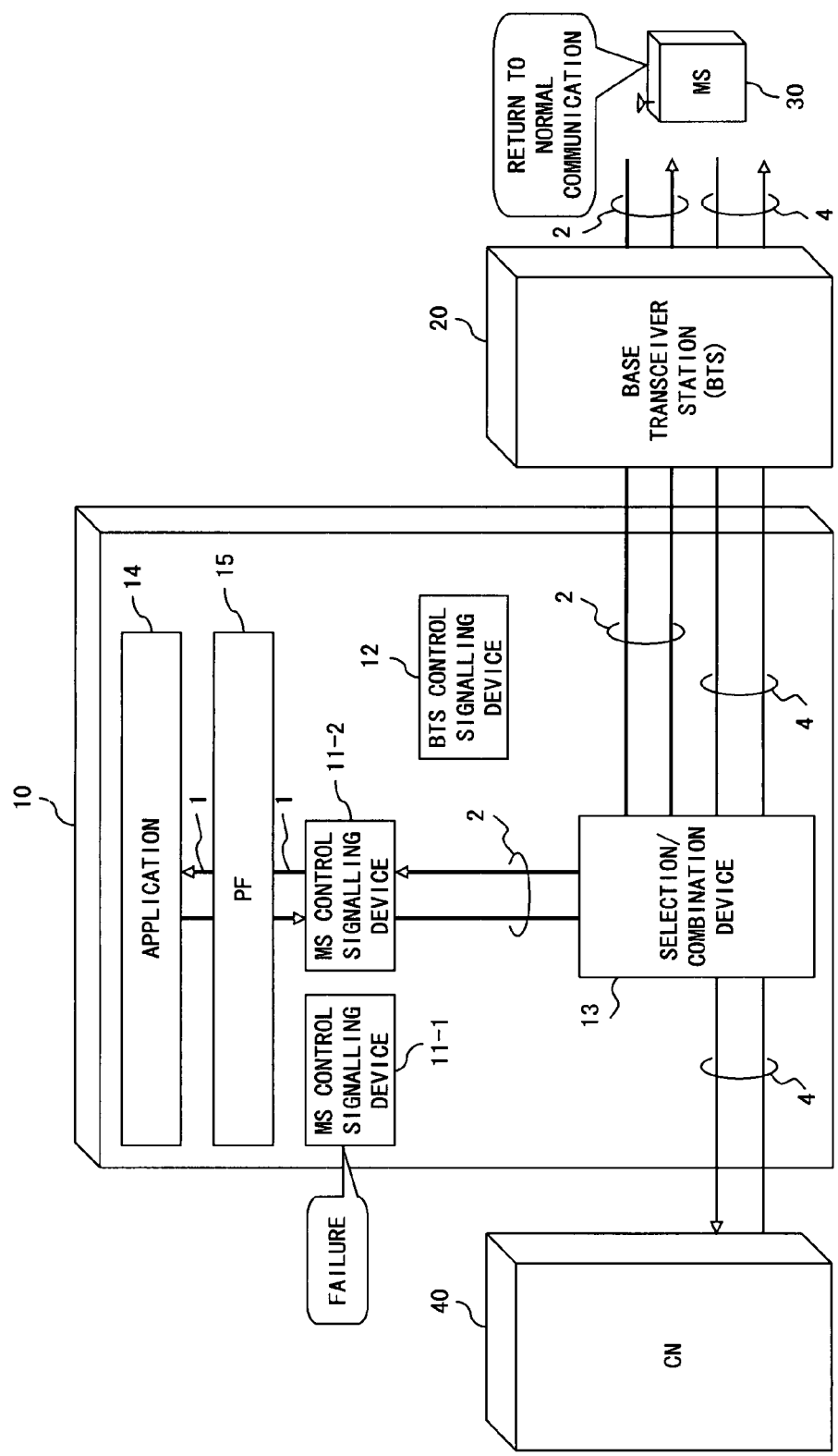

When the RLC parameters are set according to the above method 1 or method 2, the MS control signalling device 11-2 transmits/receives the MS control signal 1 to/from the application 14 as shown in FIG. 9. The MS control signalling device 11-2 also controls the communication of the mobile station 30 according to the MS control signal 1 by transmitting/receiving the MS control signal 2 to/from the mobile station 30. As a result, a state before the MS control signalling device 11-1 failed can be recovered. In other words, the mobile station 30 can perform communication with the correspondent node 40 via the selection/combination device 13 in the same manner as the state prior to the failure of the MS control signalling device 11-1.

FIG. 11 is a diagram explaining a method of switching the MS control signalling devices. The present embodiment assumes that each of the MS control signalling devices 11 (11-1, 11-2, . . . ) and the selection/combination device 13 are connected to each other via a switch 16. The MS control signal 2 is transmitted via the switch 16 using a PDU with a particular format. In such a case, the switch 16 outputs the PDU via an output port corresponding to path information set in the header of each PDU. The path information is for example VPI/VCI (Virtual Path Identifier/Virtual Channel Identifier).

Switching of the MS control signalling devices can be realized by changing the VPI/VCI. In other words, when the MS control signalling device 11-1 operates normally, the VPI/VCI directing the PDU input from a path 17 to a path 19 is used to transmit the MS control signal 2 from the MS control signalling device 11-2 to the mobile station 30, and the VPI/VCI directing the PDU input from the path 19 to the path 17 is used to transmit the MS control signal 2 from the mobile station 30 to the MS control signalling device 11-1. Consequently, a new control path is established. On the other hand, when the MS control signalling device 11-2 is selected instead of the MS control signalling device 11-1, the VPI/VCI directing the PDU input from a path 18 to the path 19 is used to transmit the MS control signal 2 from the MS control signalling device 11-2 to the mobile station 30, and the VPI/VCI directing the PDU input from the path 19 to the path 18 is used to transmit the MS control signal 2 from the mobile station 30 to the MS control signalling device 11-2. In other words, in the present embodiment, in switching of the MS control signalling devices, only a path between the MS control signalling devices 11 and the switch 16 is changed, but a path between the selection/combination device 13 and the switch 16 is not changed.

Figure 12:
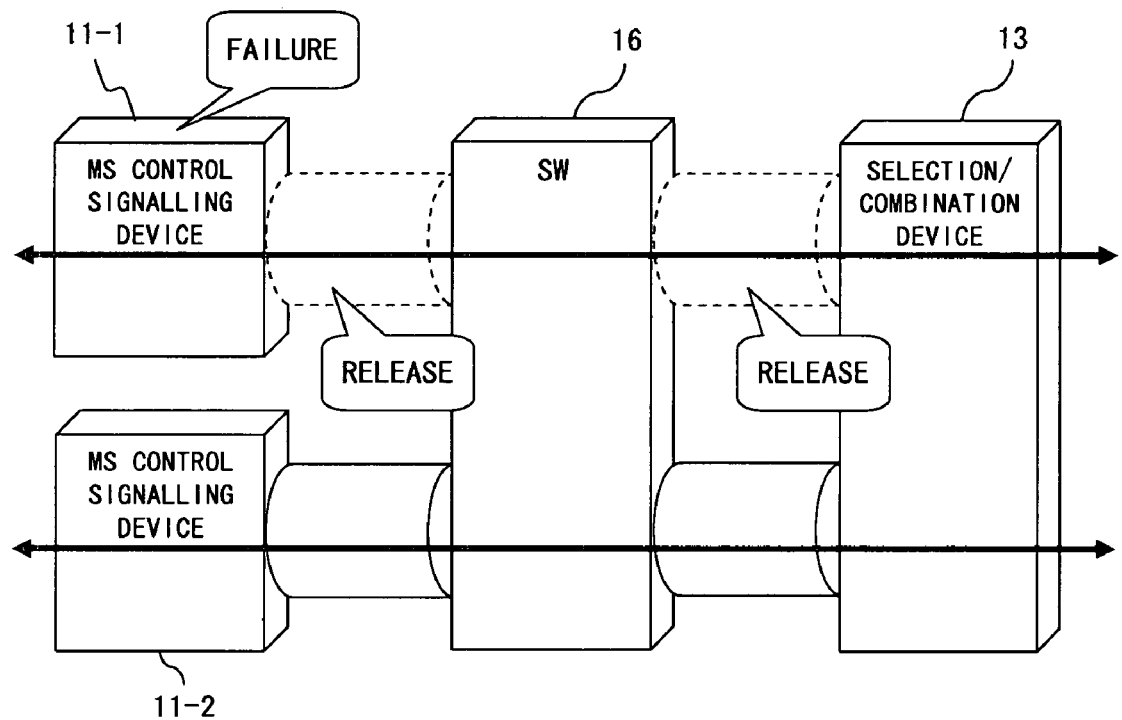
FIG. 12 is a diagram explaining a method of switching the MS control signalling devices in the related art.

In the conventional method shown in FIG. 2 through FIG. 5, the selection/combination device 13 is released at the time when the MS control signalling devices are switched. For that reason, a route for transmitting the MS control signal 2 changes as shown in FIG. 12. In other words, in the conventional method, the route between the selection/combination device 13 and the switch 16 is reset in addition to the route between the MS control signalling devices 11 and the switch 16.

In the recovery procedure of the present embodiment, the data path for transmitting the user data 4 is maintained without being released when the MS control signalling devices are switched. Here, assume that the data path is established using the switch 16 in the radio network controller 10, "holding a data path" can be realized by maintaining the correspondence between the user data 4 and the VPI/VCI, and "releasing a data path" can be realized by deleting the correspondence between the user data 4 and the VPI/VCI from a VPI/VCI table. More specifically, in the recovery procedures of the present embodiment, the VPI/VCI assigned to the user data 4 transmitted between the mobile station 30 and the correspondent node 40 is not updated at the time when the MS control signalling device to control the mobile station 30 is switched. Therefore, the user data 4 is transmitted using the VPI/VCI. However, in a case of handover of the mobile station 30, the data path of the user data 4 is disconnected once.

As explained above, according to the recovery procedures of the present embodiment, even when an MS control signalling device fails, the mute or silence does not occur since a data path for user data is maintained. It should be noted that in the conventional method, in a case of failure in an MS control signalling device, a data path is released, causing the mute or silence state.

In the recovery procedures of the present embodiment, when an MS control signalling device fails, without using a message of the layer 3 or layer of higher level, information necessary for the communication between the radio network controller and the mobile station is taken over by using the layer 2 (i.e. RLC). Therefore, calls can be restored with simpler sequence than that of the conventional method.

In addition, according to the procedure of the embodiment, when an MS control signalling device fails, because the radio network controller can autonomously proceed the recovery procedures, it is possible to recover the normal operation within a short time period. Note that in the conventional method, recovery procedures started upon issue of a reconnection request from the mobile station. For that reason, it may require a several seconds to recover the normal operation from the failure of the MS control signalling device.

In the following description, recovery time in a case of using the procedures of the embodiment is estimated. Here, assume that the RLC parameters are acquired from the mobile station 30 according to the above method 2. Additionally, the data length of each parameter is determined as below.
Transmission Sequence Number: 12 bits
Reception Sequence Number: 12 bits
HFN Value: 20 bits
Secret Key: 16×8 bits
If the frame length of the MS control signal 2 is 18 bytes, two PDUs are required in order to transmit the above RLC parameters. If, in addition, the MS control signalling device accommodates four channels per user, transmission of eight PDUs in total is required. Where radio transmission time is 320 ms, processing delay time in the base transceiver station 20 and the radio network controller 10 is 200 ms, and overhead is 500 ms, the time required for recovery is approximately one second.

It should be noted that the above embodiment shows procedures for recovery of communication by restoring a call when an MS control signalling device fails; however, the present invention is not limited to the embodiment. In other words, the present invention is applicable to all cases that an MS control signal stops due to a failure of other devices (such as selection/combination device and BTS control signalling device) in the radio network controller and suspension of services cased by blockage.

Figure 13:
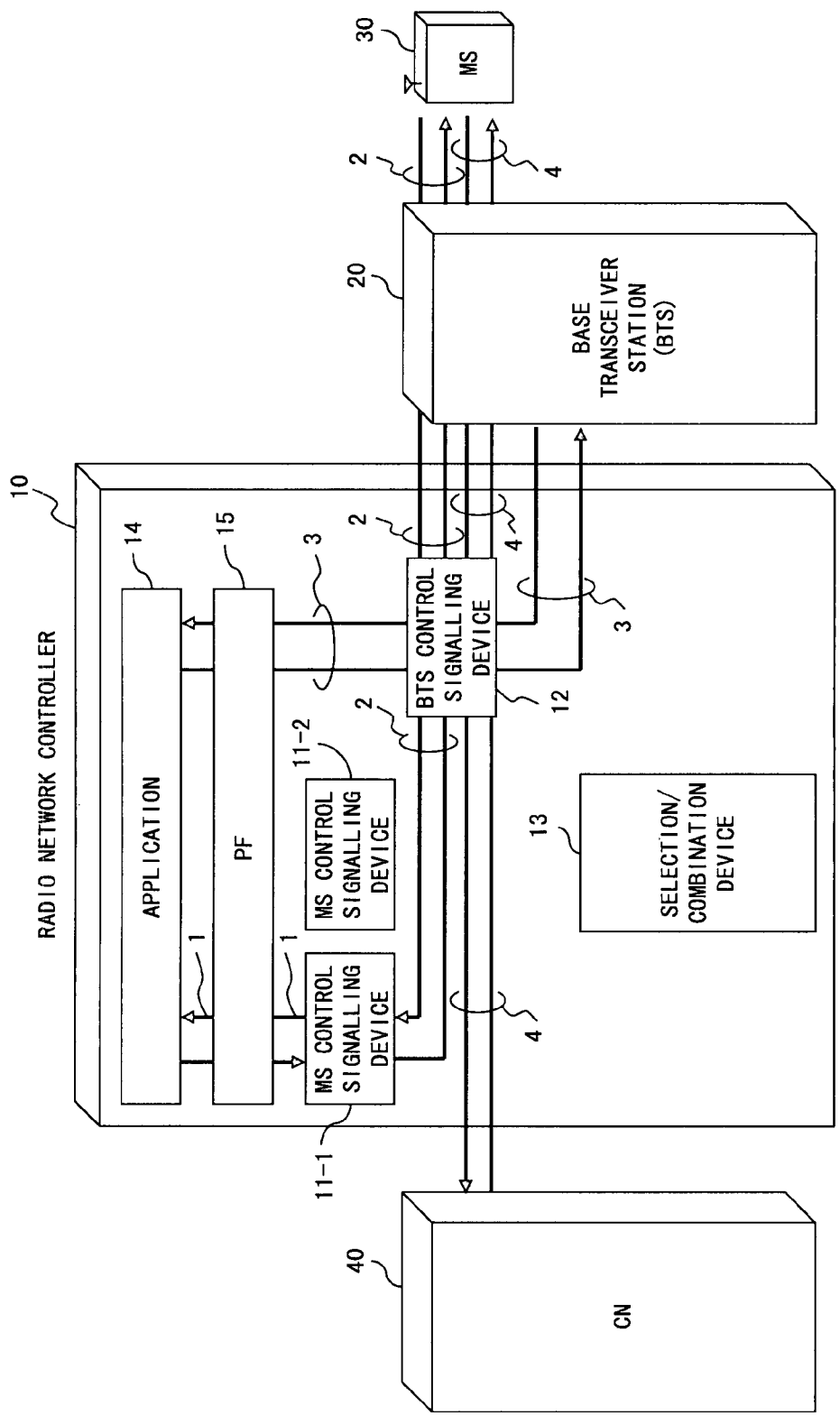
FIG. 13 is a diagram showing routes of a signal when a common system is employed.

The radio network controller 10 can switch the transmission methods for each mobile station in accordance with the traffic of the user data 4. More specifically, for example, when audio data or packet data with large data volume is transmitted, individual system is employed. In the individual system, as shown in FIG. 1, communication routes are established for each user via the selection/combination device 13. Via the communication routes, the user data 4 is transmitted. Note that in the individual system, the MS control signal 2 is also transmitted/received via the selection/combination device 13. On the other hand, in a case of transmitting packet data with small data volume, a common system is employed. In the common system, as shown in FIG. 13, using a path between the BTS control signalling device 12 and the base transceiver station 20, a communication route for transmitting the user data 4 is established. In the common system, the MS control signal 2 is also transmitted/received via the BTS control signalling device 12.

The recovery method of the present invention can be applied to both of the individual system and the common system. In other words, when the MS control signalling device 11-1 is failed in FIG. 13, an alternate route is set between the MS control signalling device 11-2 and the BTS control signalling device 12. The MS control signal 2 for the mobile station 30 is transmitted via the alternate route. It should be noted that taking over the RLC parameter is performed in the same manner as explained with reference to FIG. 6-FIG. 10.

What is claimed is:

1. A failure recovery method used in a radio network controller having a plurality of mobile station control units, comprising:
   holding a data path of a mobile station controlled by a first mobile station control unit, when a mobile station control signal relating to the first mobile station control unit stops;
   establishing a control path for transmitting a mobile station control signal between a second mobile station control unit and the mobile station while the data path of the mobile station is held;
   transmitting a request for communication parameter relating to communication of the mobile station from the second mobile station control unit to the mobile station, the communication parameter having been used in both the first mobile station control unit and the mobile station;
   transmitting the communication parameter from the mobile station to the second mobile station control unit in response to the request; and
   controlling communication of the mobile station using the communication parameter obtained by the second mobile station control unit.

2. The failure recovery method according to claim 1, further comprising
   establishing the control path between the second mobile station control unit and the mobile station when the first mobile station control unit fails.

3. The failure recovery method according to claim 1, further comprising establishing the control path between the second mobile station control unit and the mobile station when a blocking control is performed to the first mobile station control unit.

4. A radio network controller, comprising:

a plurality of mobile station control units;

a data path unit for establishing a data path for transmitting user data of a mobile station controlled by a first mobile station control unit; and a control unit for, when a control signal that the first mobile station control unit controls the mobile station stops, establishing a control path for transmitting a control signal between a second mobile station control unit and the mobile station, wherein the data path unit holds the data path of the mobile station when the control unit establishes the control path due to the stop of the control signal, the second mobile station control unit transmits a request for communication parameter relating to communication of the mobile station to the mobile station, the communication parameter having been used in both the first mobile station control unit and the mobile station;

the second mobile station control unit obtains the communication parameter from the mobile station in response to the request; and the second mobile station control unit controls communication of the mobile station using the communication parameter obtained from the mobile station.

5. The radio network controller according to claim 4, wherein the data path unit is a selection/synthesis device.

6. The radio network controller according to claim 4, wherein the data path unit is a base transceiver station control signalling device.

7. The radio network controller according to claim 4, further comprising a switch unit for provided between the plurality of mobile station control units and the data path unit, wherein the control signal is transmitted via the switch unit and the data path unit, and the control unit connects the second mobile station control unit and the data path unit by changing path information that defines a route in the switch unit.

8. The radio network controller according to claim 4, wherein the communication parameter is a variable for controlling an order of a packet transmitted or received by the mobile station.

9. The radio network controller according to claim 4, wherein the communication parameter is a variable used in an RLC layer of 3GPP.

* * * * *